Jan. 9, 1968 G. C. DYGERT ET AL 3,362,738
ADJUSTABLE FITTINGS
Filed July 27, 1965 2 Sheets-Sheet 2

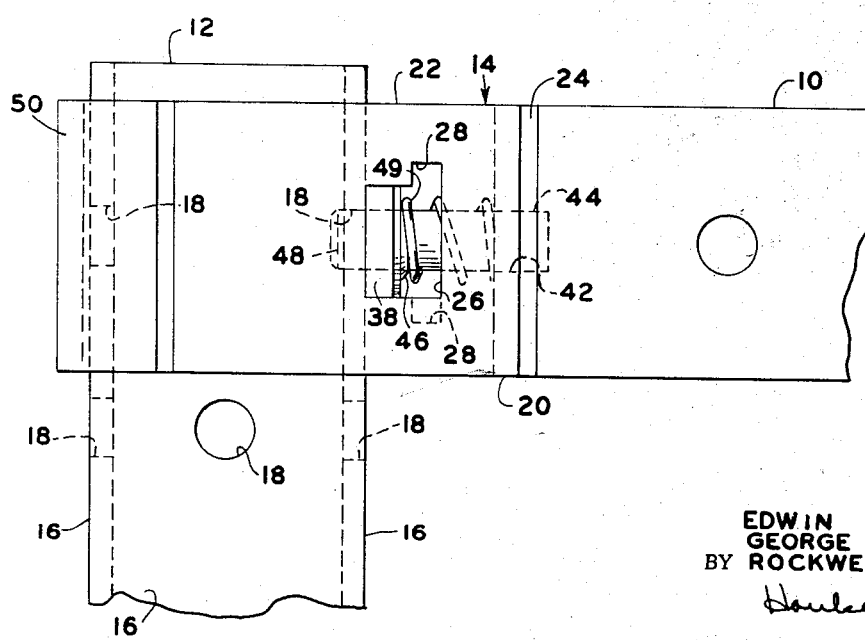

INVENTORS
EDWIN E. WALTERS
GEORGE C. DYGERT
BY ROCKWELL H. SMITH

Hawke & Hawke
ATTORNEYS

United States Patent Office 3,362,738
Patented Jan. 9, 1968

3,362,738
ADJUSTABLE FITTINGS
George C. Dygert, Livonia, Edwin E. Walters, Ann Arbor, and Rockwell H. Smith, Plymouth, Mich., assignors to Unistrut Corporation, Wayne, Mich., a corporation of Michigan
Filed July 27, 1965, Ser. No. 475,225
2 Claims. (Cl. 287—189.36)

ABSTRACT OF THE DISCLOSURE

Fittings for adjustably connecting a structural member with a second structural member provided with a surface having a plurality of spaced openings. The fittings have a portion embracing the second structural member and carrying a spring biased pin normally urged through one of the openings in the second structural member. A retracting bar is fastened to the pin with both its ends disposed freely in elongated apertures in the fitting. The apertures in the fitting are provided with diagonally disposed notches in which the ends of the bar are engaged for maintaining the pin in a retracted position.

---

The present invention relates to fittings and more particularly to a means for adjustably securing one structural member to another.

A copending application Ser. No. 833,023 filed Aug. 11, 1959, now Patent No. 3,284,971 issued Nov. 15, 1966 discloses a new structural framing member comprising a tubular member which is square in cross-section and which is provided on its faces with a plurality of centrally disposed and equally spaced perforations.

The present invention provides fittings having means for adjustably mounting a structural member to framing members like those disclosed in the aforementioned patent application. Use of the fittings of the present invention with such framing members then provides a convenient means of assembling structures such as storage racks or the like where adjustability is desired.

It is an object of the present invention to increase the utility of perforated tubular structural members by providing a new fitting for use with such structural members for adjustably mounting a second structural member thereto.

It is another object of the present invention to provide an improved means of constructing racks or the like by providing a fitting having means for adjustably locking a support for a shelf structure or the like to a structural support member.

It is still another object of the present invention to improve fittings for adjustable mounting on perforated support members by providing a fitting having a pin for insertion into a desired perforation and means for locking the pin in a retracted position to aid in adjusting the position of the fitting and the framing member carried thereby.

Still further objects and advantages of the present invention will readily occur to one skilled in the art to which the invention pertains upon reference to the following drawings in which like reference characters refer to like parts throughout the several views and in which FIG. 1 is an elevational side view of a structural assembly utilizing one preferred fitting of the present invention FIG. 2 is an enlarged fragmentary elevational side view of a portion of the structure shown in FIG. 1.

FIG. 3 is a cross sectional view taken substantially on line 3—3 of FIG. 1 and enlarged somewhat for purposes of clarity.

FIG. 4 is a cross sectional view similar to FIG. 3 but illustrating the fitting in a locked retracted position.

FIG. 5 is a cross sectional view taken substantially on line 5—5 of FIG. 4.

Figure 7:
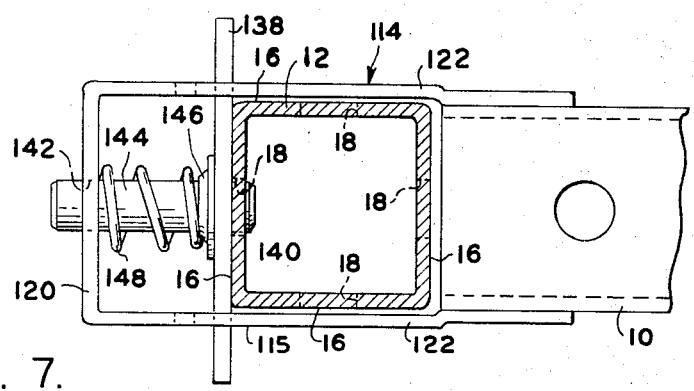
FIG. 7 is a top elevational view of the structural assembly illustrated in FIG. 6

Now referring to the drawings for a more detailed description of the present invention, FIGS. 1–5 illustrate one preferred embodiment thereof as comprising a support member 10 adapted to be supported between a pair of vertical framing members 12. It is to be understood that the present invention can be used in any structural assembly wherein it is desired to adjustably secure a structural member like support member 10 to another structural member like one of the framing members 12. In the embodiment illustrated in FIGS. 1–5, the structural assembly is a portion of an adjustable rack structure but this is not necessary for purposes of the invention.

To secure the support member 10 to the framing members 12 a fitting 14 is carried at each end of the support member 10. As can best be seen in FIGS. 3–4 the framing members 12 are preferably like those disclosed in the aforementioned patent application and therefore are preferably square in lateral cross section to form outer elongated surfaces 16. The surfaces 16 are provided with equally spaced central perforations 18 on each of the faces 16 respectively aligned with perforations 18 provided on the opposite face 16.

The fittings 14 each comprises a substantially U-shaped member 15 in top plan view having a base portion 20 and a pair of parallel extending legs 22. The base portion 20 is secured to the end of the support member 10 by any convenient means such as welding as shown at 24.

As can best be seen in FIGS. 2 and 5, the legs 22 are provided with aligned openings 26. The openings 26 are substantially rectangular but notches 28 are provided which register with the openings 26 with the notch 28 in one of the legs 22 registering with the upper portion of the corresponding opening 26 and the notch 28 in the other leg 22 registering with the lower portion of the corresponding opening 26. The notches 28 register with the openings 26 in the ends of the openings 26 closest to the base portion 20 of the member 15.

The openings 26 provide the means for carrying a rectangular bar 38 which extends through the openings 26 and which has its ends disposed exteriorly of the U-shaped member 15. The bar 38 is provided with a central perforation 40 which provides the means in combination with an aligned perforation 42 provided in the base portion 20 for carrying a pin 44. A washer 46 is secured to the pin 44 intermediate the bar 38 and the base portion 20 and provides the seat for a spring 49 having its opposite end seated against the base portion 20 to urge the pin 44 into the perforation 40 and the washer 46 against the bar 38. The pin 44 is sufficiently long to have its opposite end retained within the perforation 42 and to have an end portion 48 extending through the perforation 40 to be disposed on the opposite side of the bar 38 as can best be seen in FIGS. 3 and 4.

The framing member 12 is adapted to be disposed intermediate the legs 22 of U-shaped member 15 with one of the faces 16 disposed closely adjacent the bar 38. A U-shaped retaining member 50 is preferably secured to the legs 22 to retain the framing member 12 within the U-shaped member 15. The pin 44 is dimensioned to extend into any desired perforation 18 on the adjacent face 16 to thereby lock the fitting 14 to the framing member 12.

When its is desired to adjust the support member 10 to a new axial position on the framing members 12 the bar 38 of each fitting 14 is moved in the openings 26 against the force of the spring 49 to retract the pins 44 from the perforations 18. With the pins 44 in the retracted position the bars 38 are rotated about the pins 44 to bring portions on opposite edges of the bars 38 into the notches 28 and to the position shown in FIGS. 4-5. This prevents the bar 38 from being moved by the spring 49 and thus locks the pin 44 in a position retracted from the peforations 18. With the pins 44 in the locked retracted position, the fittings 14 can be moved axially along the framing members 12 to the desired new position and the bars 38 are rotated from the notches 28 to permit the pins 44 to be urged into the new perforations 18.

Figure 8:
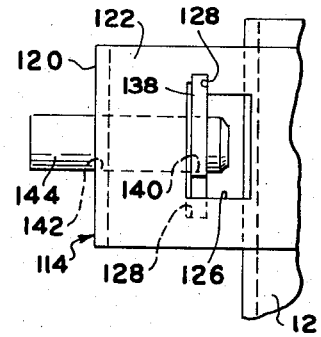
FIG. 8 is a fragmentary view illustrating a portion of the assembly shown in FIG. 6 but showing the fitting in a locked retracted position.
Figure 6:
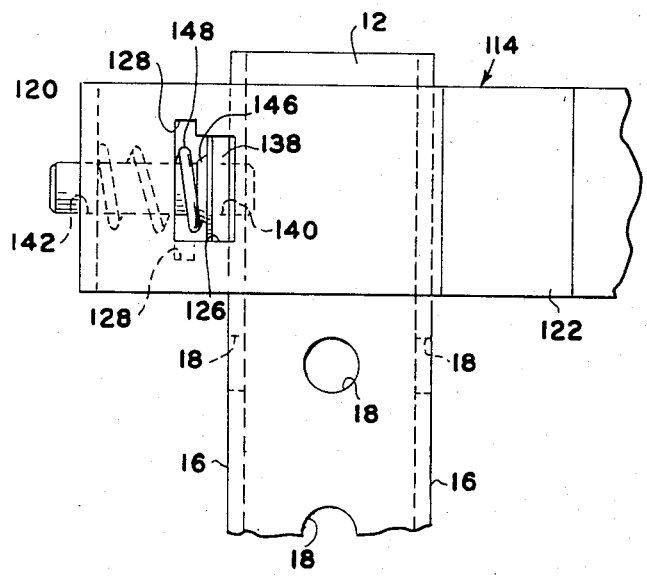
FIG. 6 is a side elevational view of a structural assembly utilizing another preferred fitting of the present invention.

FIGS. 6-8 illustrate another preferred fitting 114 similar to the embodiment described above but in which the legs 122 of the U-shaped member 115 are secured to the surface of the support member 10 and the framing member 12 is disposed within the U-shaped member 115 intermediate the bar 138 and the end of the support member 10.

The base portion 120 of the U-shaped member 115 is provided with a perforation 142 which is aligned with a perforation 140 provided in the bar 138. A pin 144 extends through the perforations 140 and 142 to engage in one of the openings 18 provided in the adjacent face 16 of the framing member 12 to lock the fitting 114 in a desired axial position on the framing member. A spring 148 biased between the base portion 120 of the U-shaped member 115 and a washer 146 secured to the pin 144 urges the bar 138 against the edges defining the ends of the openings 126 and the end of the pin 144 into one of the perforations 18 of the framing member 12.

Notches 128 are provided registering with the upper portion of one of the openings 126 and the lower portion of the other opening 126 and in the ends of the openings 126 away from the framing member 12 to permit the pin 144 to be locked in a retracted position substantially as described above with respect to the embodiment of FIGS. 1-5.

It is apparent that fittings have been described which can be used to lock a support member to a perforated framing member in a number of desired axial positions. Such a fitting finds use in a number of structural assemblies but is especially useful in storage racks or the like where it is desirable to have means for adjusting the size of the individual storage areas to permit the most efficient use to be made of the total available storage area.

While the particular structural assembly described herein provides a secure engagement between the framing members and the support member it also provides a means in which adjustment can be easily accomplished. The means of locking the pin in the retracted positions permits the fitting to be easily moved past several or more perforations in the support member 10. The particular means disclosed for locking the pin in the retracted position is simple in construction and adds little cost to the fitting so that the assembly is relatively economical to manufacture.

It is also apparent that although we have described but two embodiments of our invention, many changes and modifications can be made therein without departing from the spirit of the invention as expressed by the scope of the appended claims.

We claim:

1. In a structural assembly, means for adjustably locking a first structural member to a second structural member, the second structural member being elongated and having a surface provided with a plurality of spaced openings therein, said means comprising
   (a) a fitting affixed to one end of said first structural member and having a substantially U-shaped member peripherally surrounding said second structural member,
   (b) said U-shaped member comprising a base portion spaced from said surface of said second structural member and a pair of arm portions embracing said second structural member,
   (c) aligned elongated openings each provided in each of said arm portions,
   (d) a bar member movably disposed in said openings,
   (e) said bar member and said base portion having aligned apertures,
   (f) a pin extending through said apertures,
   (g) said pin being fixed to said bar member near the end thereof opposite said base portion and extending therethrough whereby said pin and said bar member move together from an extended position in which said pin extends into one of said openings in said surface to a retracted position in which said pin is retracted from said last mentioned opening upon movement of said bar member within said arm portion openings, said base portion aperture and openings in the arm portion being disposed to coact with said pin and said bar member respectively to maintain orientation of said pin and to guide said pin into and out of said structural member openings during movement of said pin and bar member intermediate said extended and retracted positions,
   (h) biasing means disposed intermediate said base portion and said bar member urging said pin to said extended position; and
   (i) means operable to lock said bar member in a position in which said pin is in said retracted position, said means comprising
      (1) a notch provided in each of said arm portion openings in the end thereof proximate said base portion, and
      (2) one of said notches being disposed to register with an arm portion opening at one edge thereof and the other of said notches being disposed to register with the other of said arm portion openings at an edge opposite to said first mentioned edge whereby the ends of said bar member are received by said notches only upon rotation of said bar portion.

2. The means claimed in claim 1 wherein the means connecting said bar member and said pin comprises a washer member secured to said pin and said biasing means is a coil spring disposed around said pin and urging said washer member against said bar member.

References Cited

UNITED STATES PATENTS

| 1,201,789 | 10/1916 | Aldworth | 248—287 |
| 1,491,685 | 4/1924 | Eicher et al. | 248—408 |
| 1,732,081 | 10/1929 | Clement | 248—408 |
| 1,888,478 | 11/1932 | Steidl | 108—146 |
| 2,140,132 | 12/1938 | Hollett | 85—5 |
| 2,514,524 | 7/1950 | Steele | 108—146 |
| 2,816,471 | 12/1957 | Bachman | 85—5 |

FOREIGN PATENTS

| 446,299 | 1/1948 | Canada. |
| 615,210 | 2/1961 | Canada. |

MARION PARSONS, Jr., *Primary Examiner.*